May 21, 1957  G. H. DOWTY  2,792,998
BRAKE SYSTEM ON AIRCRAFT MULTI-WHEEL BOGIE UNDERCARRIAGE
Filed Oct. 21, 1953  4 Sheets-Sheet 1

INVENTOR
George H. Dowty
BY
Reynolds, Beard & Christensen
ATTORNEYS

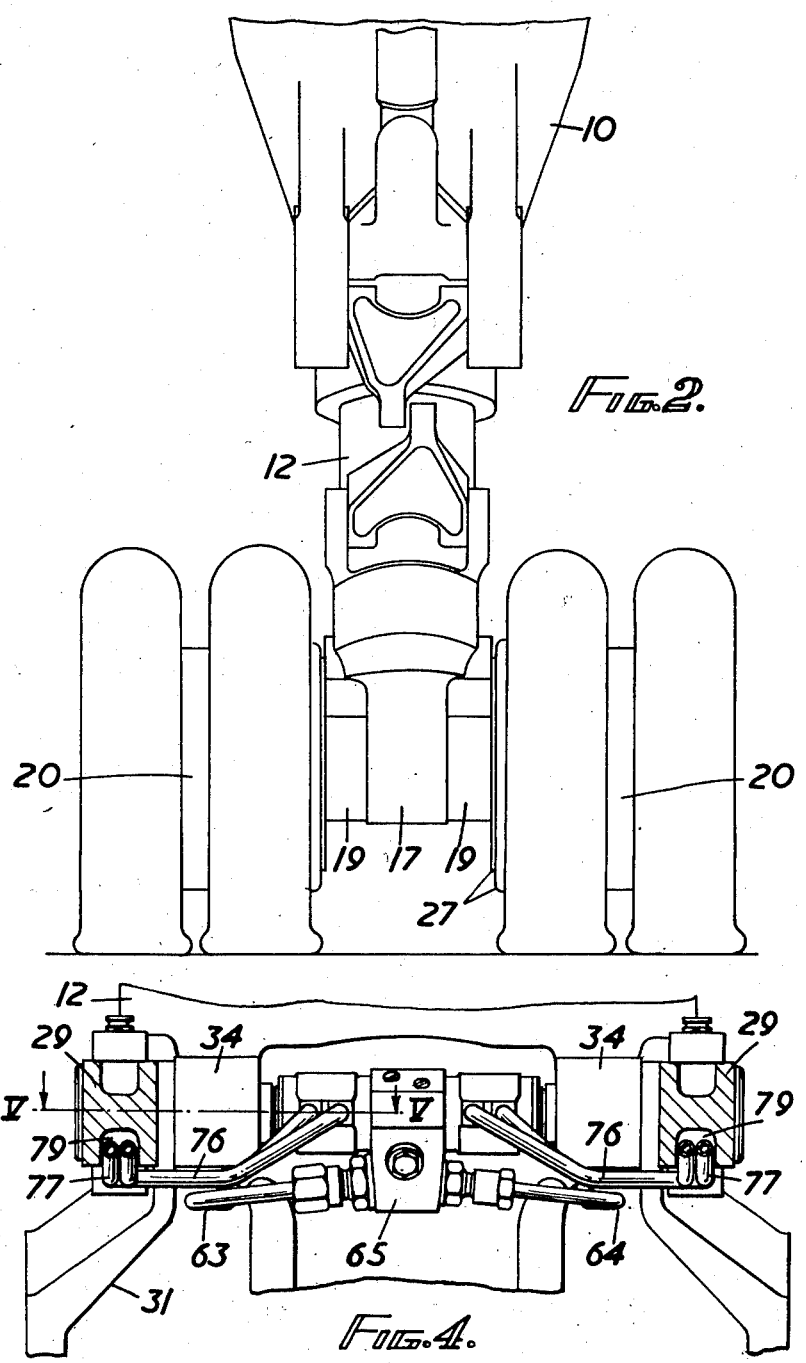

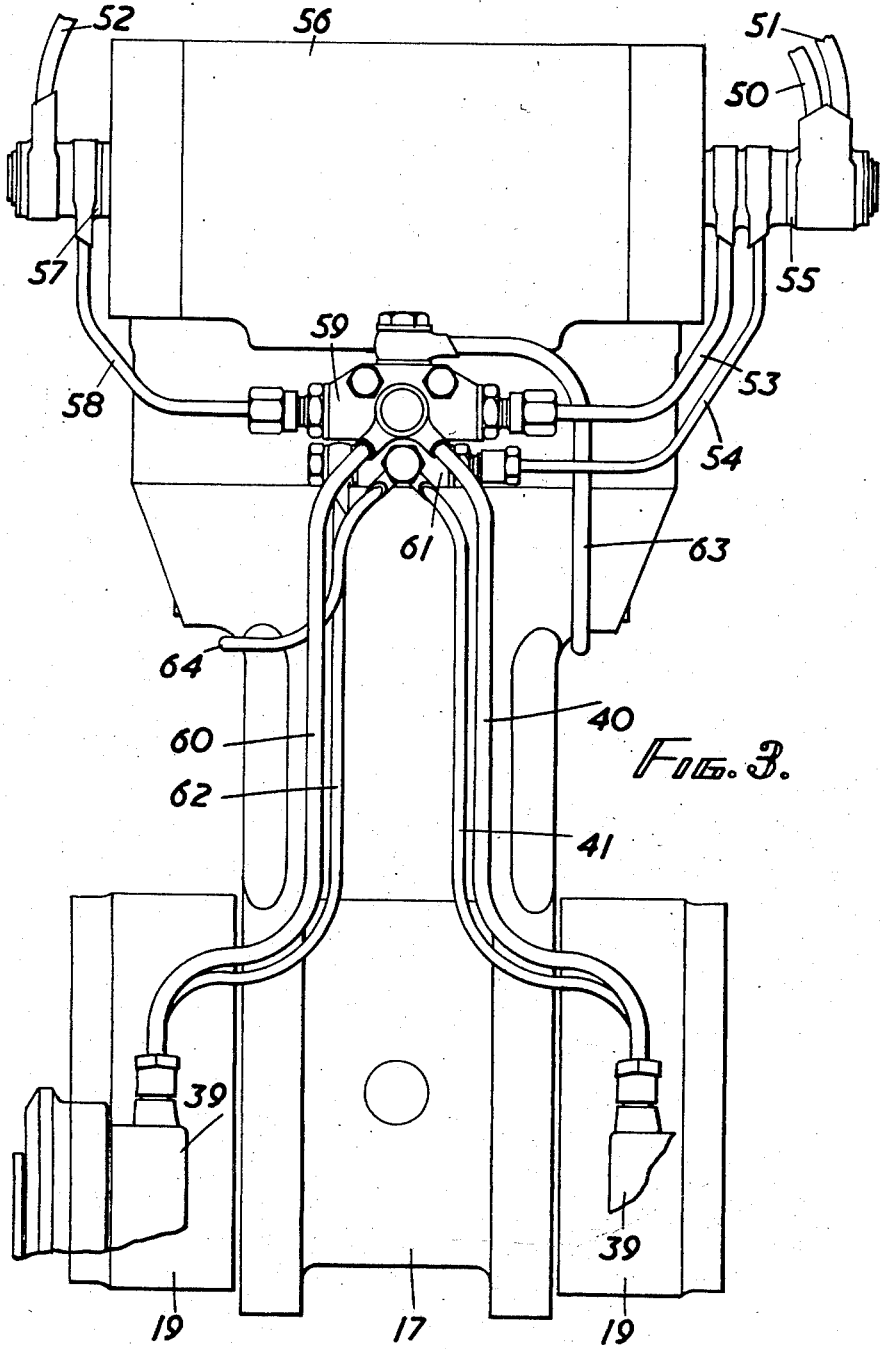

May 21, 1957  G. H. DOWTY  2,792,998
BRAKE SYSTEM ON AIRCRAFT MULTI-WHEEL BOGIE UNDERCARRIAGE
Filed Oct. 21, 1953  4 Sheets-Sheet 4

INVENTOR
George H. Dowty
BY
Reynolds, Beck & Christensen
ATTORNEYS

United States Patent Office 2,792,998
Patented May 21, 1957

2,792,998

BRAKE SYSTEM ON AIRCRAFT MULTI-WHEEL BOGIE UNDERCARRIAGE

George H. Dowty, Cheltenham, England, assignor to Dowty Equipment Limited, Cheltenham, England Application October 21, 1953, Serial No. 387,450

Claims priority, application Great Britain October 23, 1952

4 Claims. (Cl. 244—111)

This invention is concerned with the hydraulic brake conduits of an aircraft multi-wheel undercarriage in which longitudinally spaced wheel axles are journalled at the ends of a rigid or articulated bogie frame which is pivotally attached to a main supporting leg so as to be movable relatively to the aircraft structure against shock-absorber resistance under landing and taxiing loads. Each axle carries at least one wheel with associated brake on either side of the bogie frame, so that each undercarriage unit generally involves four sets of brake-actuating mechanism to be connected with the hydraulic system. Each brake comprises a fixed part generally referred to as a torque plate and each torque plate is connected directly or indirectly through linkage with the leg, and not at all to the bogie frame, for transfer of brake reaction to the leg as directly as possible.

As a safety precaution against the possibility of failure of the brakes it is usual to duplicate the pressure conduits and to provide a shuttle valve whereby a pressure conduit which fails will be automatically isolated from the brake circuit. The return conduit is not generally duplicated. There are thus usually three conduits which have to establish communication from three points on the leg to three points on each of the four brakes, and such conduits must be arranged to allow for movements of the bogie frame and of the leg if, as is usual, this is telescopic, and also to allow for relative turning between the torque plates and bogie frame during swinging of the latter.

The present invention seeks to provide an improved construction and arrangement of brake conduits, enabling these to conform closely to the structural elements of the landing gear.

The invention is illustrated, by way of example, with reference to one form of multi-wheel undercarriage shown in the accompanying drawings, of which:

Figure 2 is a front elevation of the undercarriage showing a complete set of wheels but excluding details of the brake pipe-work;

Figure 3 is a front elevation on a large scale of part of Figure 2 viewed in the direction of line III of Figure 1, and showing the arrangement of the associated brake pipe-work;

Figure 4 is a rear elevation on an enlarged scale of part of the undercarriage leg viewed in the direction of arrow IV of Figure 1, and showing the arrangement of brake pipe-work at the rear of the leg;

Figure 1:
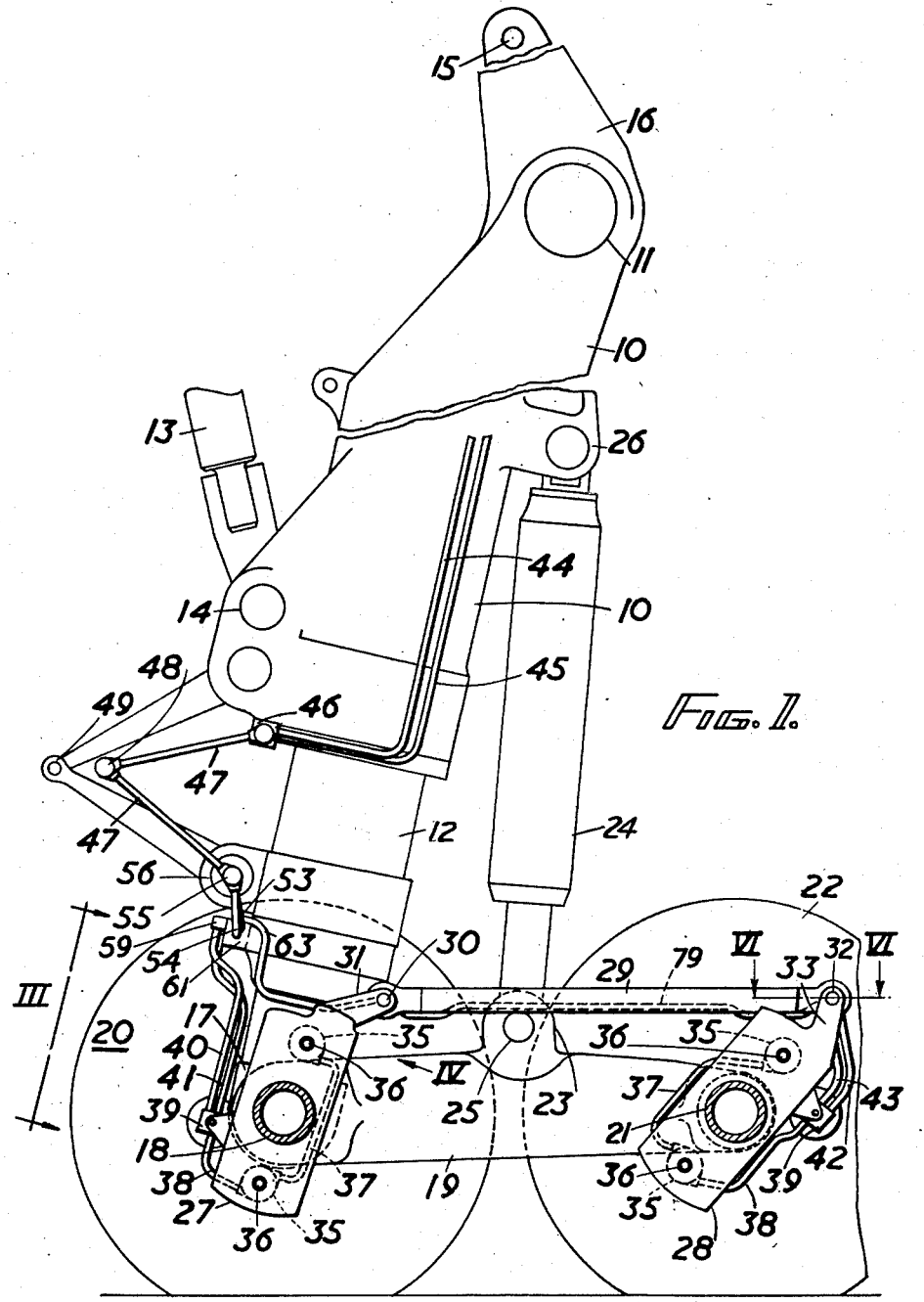
Figure 1 is a side elevation of an aircraft multi-wheel undercarriage with the near side set of wheels removed to show details of the bogie and brake mechanism.

Referring first to Figures 1 and 2, the undercarriage comprises generally a telescopic leg having an upper leg component 10 provided with a bearing 11 for pivotal mounting on the aircraft, and a lower leg component 12 mounted slidably in the upper component 10. A drag stay 13 is connected at its lower end to the component 10 on a pivot 14, while its upper end is adapted for connection with the retraction mechanism, which is not shown, but which includes a hydraulic jack adapted for connection at 15 to an arm 16 extending integrally from the upper leg component 10.

The bottom end of the tubular lower leg component 12 is formed as a lug 17 which carries a transverse axle 18 upon which the forked forward end of a bogie frame 19 is mounted. The axle 18 extends transversely on opposite sides of the bogie frame 19 to carry two front twin-wheel assemblies 20 which are arranged symmetrically on each side of the leg. The rear end of the bogie 19 carries a transverse axle 21 upon which two rear twin-wheel assemblies 22 are mounted in like manner. An upstanding lug 23 is formed in the centre of the bogie frame 19 to which the lower end of a telescopic shock-absorber 24 is pivotally attached at 25, while the upper end of the shock-absorber 24 is pivotally attached to a rearwardly projecting lug 26 on the upper leg component 10. This undercarriage is constructed and arranged to operate substantially as described in the specification filed in the name of Patrick Bonar, of U. S. patent application Serial No. 193,366, dated November 1, 1950, now Patent No. 2,731,218, dated January 17, 1956.

A brake-plate is provided for each twin-wheel assembly, the front and rear brake-plates 27 and 28 appertaining to the near side set of twin-wheels which are removed in Figure 1, the off-side set of twin wheels being visible only. The front and rear brake-plates appertaining to the off-side twin-wheels of Figure 1 are of opposite hand to the plates 27 and 28 shown, and it is to be understood that the description of the brake mechanism with the associated torque linkage and pipe work relating to the near side set of twin-wheels is equally applicable to that relating to the off-side twin-wheels. The brake-plates 27 and 28 are mounted to turn on the respective axles 18 and 21 and they are interconnected by a torque link 29 whose front end is pivoted at 30 to a lug 31 on the torque-plate 27, and whose rear end is pivoted at 32 to a lug 33 on the torque-plate 28, the centres of the pivots 30 and 32 and the axles 18 and 21 each forming the corner of a parallelogram. The pivot 30 is anchored in a lug 34 which is formed on the lower leg component 12 as shown in Figures 4 and 5, so that the brake reaction on the plates 27 and 28 is taken directly by the leg and not by the bogie frame 19.

Each brake-plate 27 and 28 has a pair of hydraulic actuators 35 of piston-and-cylinder type mounted thereon, and each actuator 35 has a stem 36 passing through an aperture in the brake-plate into operative connection with disc-type brakes which are mounted in each twin-wheel. The hydraulic actuators 35 on each brake-plate 27 and 28 are interconnected by a pipe 37 (see Figure 1) for operation in parallel from a common supply pipe 38 which leads from an automatic brake torque limiting valve 39 mounted on each torque-plate. Each brake torque limiting valve 39 is of known type wherein the pressure in the supply pipe 38 is automatically regulated by an inertia device to prevent skidding of the wheels. A pressure pipe 40 and a return pipe 41 lead into the front brake torque limiting valve 39, while a pressure pipe 42 and a return pipe 43 lead into the rear brake torque limiting valve 39, and the manner in which connection is made to these pipes from pipes on the upper leg component 10 will now be described.

On the near side of the upper leg component 10 are shown a pressure pipe 44 and a return pipe 45, while a duplicate pressure pipe on the opposite side of the leg component 10, and therefore not seen in Figure 1, leads together with pipes 44 and 45 to co-axial swivel couplings indicated at 46. The liquid connections continue from the swivel couplings 46 to the lower leg component 12 by way of a scissors type of pipe linkage shown generally at 47 wherein the pipes and the intermediate swivel joints 48 are disposed adjacent the torque linkage 49 which mechanically connects the upper and lower leg components 10 and 12. The connection of the scissors type pipe linkage 47 to the lower leg component is shown in Figure 3 wherein the pressure pipe 50 and a return pipe 51 (of the scissors type pipe linkage 47) lead from the pressure pipe 44 and return pipe 45 (Figure 1) respectively, while a duplicate pressure pipe 52 is in communication with the duplicate pressure pipe on the remote side of the leg, unseen in Figure 1. The pressure pipe 50 and return pipe 51 lead to pressure and return pipes 53 and 54 respectively, through a twin-swivel joint 55 which is anchored on one side of a lug 56 (see Figure 3) formed on the lower leg component 12, while the duplicate pressure pipe 52 communicates through a single swivel joint 57 anchored on the opposite side of the lug 56 with a pressure pipe 58. The pressure pipes 53 and 58 lead to a shuttle valve 59, of known type, which is provided to isolate either pipe 53 or pipe 58 in the event of failure in the connections leading thereto, and the outlet from the shuttle valve is branched into right and left hand pressure pipes 40 and 60 respectively leading to the brake torque limiting valves 39 associated with the front twin-wheels. The return pipe 54 is branched directly through a junction 61 into right and left return pipes 41 and 62 respectively which lead in like manner to the brake torque limiting valves 39 associated with the front twin-wheels. A third pressure pipe 63 and a third return pipe 64 lead from the shuttle valve 59 and the junction 61 respectively, to supply the hydraulic brake actuators associated with the rear twin-wheels of the bogie frame, and these pipes pass around the lower leg component 12 on opposite sides to a coupling box 65 which is mounted centrally on the rear of the lower leg component 12 as shown in Figure 4.

Figure 5:
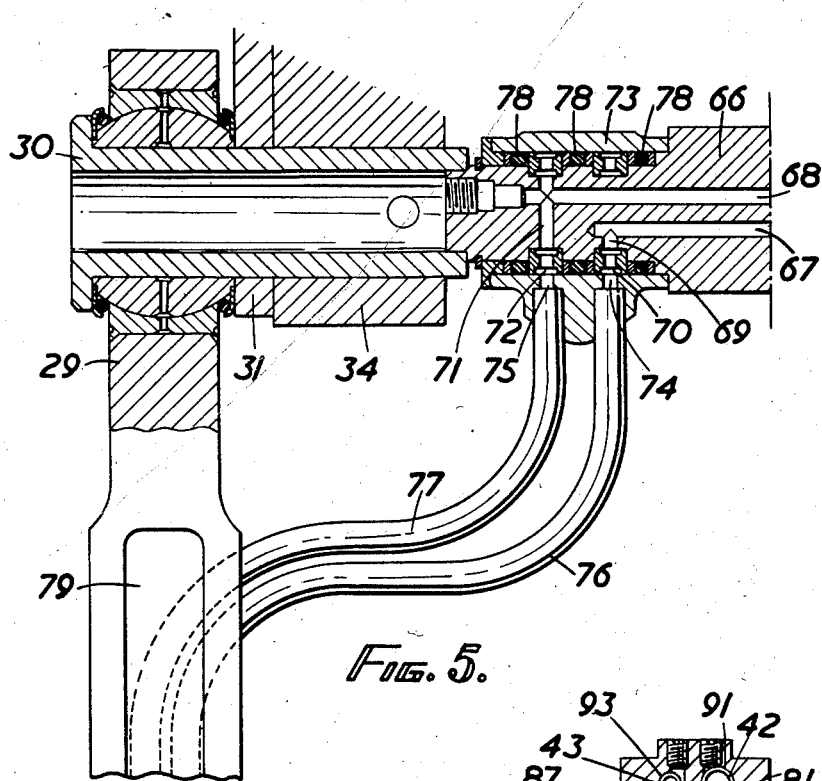
Figure 5 is a horizontal section on the line V—V of Figure 4.
Figure 6:
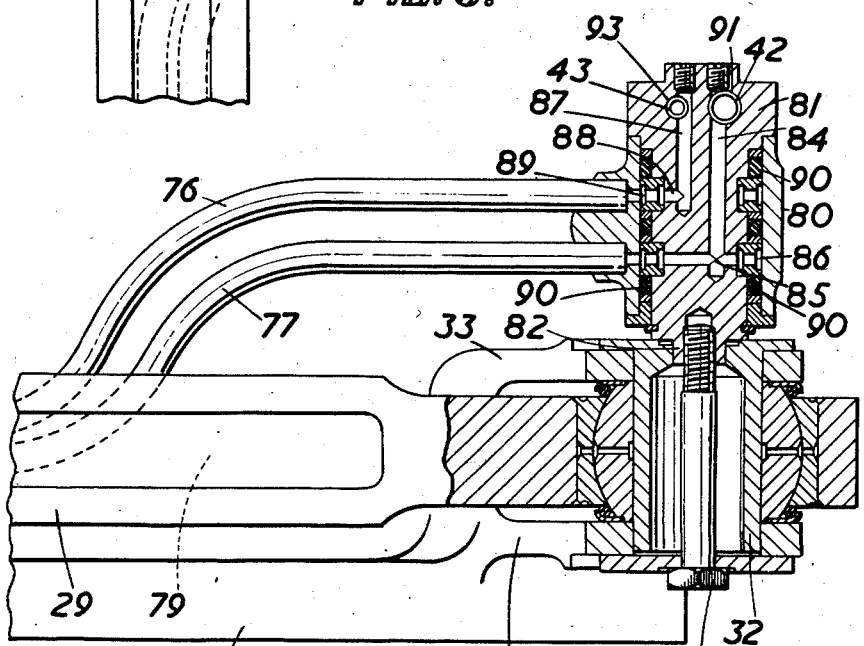
Figure 6 is a horizontal section on the line VI—VI of Figure 1 showing the near side detail of the brake torque link and associated pipe swivels.

Referring to Figures 4 and 5, the coupling box 65 has a laterally extending spigot 66 which is symmetrical on opposite sides of the centre line, and which contains a drilled passage 67 communicating with the pressure pipe 63 and a second drilled passage 68 communicating with the return pipe 64. The construction shown in Figure 5 appertains to the near side twin-wheels of Figure 1 and this will be described only as the construction is duplicated in the opposite handed sense on the other side of the centre line which appertains to the off-side set of twin-wheels at the rear. The passage 67 opens through a radial hole 69 into a circular groove 70 formed around a reduced portion of the spigot 66, and the passage 68 opens similarly through a radial passage 71 into a circular groove 72 formed around the reduced portion of the spigot 66, the groove 72 being laterally separated from the groove 70. A swivel collar 73 having a cylindrical bore fits over the reduced portion of the spigot 66 and has drillings 74 and 75 which are in register with the grooves 70 and 72 respectively, and which open into pressure and return pipes 76 and 77 respectively brazed into the swivel 73. Packing ring assemblies 78 are interposed between the spigot 66 and the swivel 73 on opposite sides of, and between, the grooves 70 and 72 to prevent leakage. The spigot 66 is recessed at its end into the bearing pin 30 so that the bore of the swivel collar 73 is co-axial with the pin 30 whereby the pipes 76 and 77 will turn with the torque link 29 about the axis of the pin 30 and swivel collar 73 as the result of the turning movement of the bogie 19 with respect to the lower leg component 12. The pipes 76 and 77 over the greater part of their rearwardly extending lengths are recessed into a channel 79 which is formed on the underside of the torque link 29. At the rearward end of the torque link 29, the pipes 76 and 77 leave the channel 79 and enter a swivel collar 80 (Figure 6) which is mounted to turn on a spigot 81.

The spigot 81 has a square-sectioned end portion 82 which is keyed into the pivot-pin 32 and secured to it by a bolt 83. The bolt 83 also serves to clamp the bearing pin 32 against turning with respect to the lug 33 of the brake-plate 28 so that the spigot 81 is thus held fast with respect to the brake-plate 28. A longitudinal passage 84 formed in the spigot 81 opens by way of a radial hole 85 into a circular groove 86 which is formed around the spigot 81, while a second longitudinal passage 87 in the spigot opens by way of a radial hole 88 into a second circular groove 89 which is laterally separated from the groove 86. Packing ring assemblies 90 are interposed between the swivel collar 80 and the spigot 81 on opposite sides of, and between, the grooves 86 and 89 to prevent leakage. A hole 91 drilled across the spigot opens into the passage 84 and the pipe 42 connected with the rear torque limiting valve 39 is brazed therein, and similarly a hole 93 drilled across the spigot 81 opens into the passage 87 and the other pipe 43 connected with said valve 39 is brazed therein.

The parallelogram linkage formed by the lower leg component 12, the bogie frame 19, the rear torque-plate 28 and the torque linkage 29 will be deformable in consequence of angular movement between the bogie frame 19 and the leg as the result of landing and taxiing of the aircraft, and in consequence of swinging movement of the bogie frame 19 relative to the leg during retraction of the undercarriage. The resulting angular movement between the pipe-work associated with the leg and that associated with the link 29, and between the latter and the pipe-work associated with the rear torque-plate will take place in conformity with the angular movement between the corresponding sides of the parallelogram linkage without strain on the pipe lengths which form the conduit means extending between the lower leg component 12 and the brake torque limiting valve 39 on the rear torque-plate 28. Moreover, the pipe lengths referred to conform generally to the parts of the undercarriage mechanism with which they are associated and are thus substantially prevented from accidental damage, and at the same time present a clean and tidy appearance of the undercarriage mechanism as a whole.

I claim:

1. In combination with an aircraft undercarriage which comprises a generally upright landing leg, a bogie frame, a first journal means pivotally supporting one end of said bogie frame upon the lower end of said leg, for relative swinging movement of the opposite end of said bogie frame in an upright fore and aft plane, shock absorber means reacting between said bogie frame and said leg to limit such swinging movement, a first wheel assembly rotatively mounted upon said first journal means, a second journal means upon the swinging end of said bogie frame parallel to said first journal means, and a second wheel assembly rotatively mounted thereon; brake means for said wheel assemblies which comprises a brake plate pivotally mounted coaxially of said second journal means, for swinging movement with but for pivotal movement independently of said bogie frame, a torque link pivotally connected at its one end to said brake plate at a given radial distance and direction from the axis of said second journal means, a pivot connection for the opposite end of said torque link, fixed with respect to said leg, located at the same radial distance from the axis of said first journal means, and in a direction parallel to the direction of the first-mentioned radial distance, fluid pressure brake actuating devices operatively connected to each wheel assembly, and pressure fluid conduits extending from said landing leg to each of said brake actuating devices, said conduits including two swivel joints supported fixedly and coaxially with relation to the respective pivotal connections of said torque link, a section fixedly mounted upon said torque link and joining said two swivel joints, a section fixedly mounted upon said brake plate and connected to the corresponding brake actuating device, and a section fixedly mounted with relation to the leg and connected to the corresponding brake actuating device.

2. In combination with an aircraft undercarriage which comprises a generally upright landing leg, a bogie frame, a first journal means pivotally supporting one end of said bogie frame upon the lower end of said landing leg for swinging in an upright fore and aft plane, a first wheel assembly rotatively mounted upon said first journal means, a parallel second journal means upon the swinging end of said bogie frame, a second wheel assembly rotatively mounted upon said second journal means, and shock absorber means reacting between said bogie frame and said landing leg; brake means for said wheel assemblies which comprises a first brake plate mounted coaxially of said first journal means and fixed relatively to said landing leg, a second brake plate mounted coaxially of said second journal means and swingable with but free to oscillate relative to said bogie frame, a torque link, pivot pins joining said torque link to each of said brake plates, at points equally distant from and located along parallel radii of their respective journal axes, fluid pressure brake actuating devices mounted upon each brake plate for operation of brakes on the corresponding wheel assemblies, and pressure fluid conduits extending from said landing leg to the several brake actuating devices, said conduits including swivel joints disposed coaxially of and mounted upon said pivot pins, and sections fixedly mounted with respect to the landing leg, the two brake plates, and the torque link.

3. In an aircraft undercarriage, in combination with a generally upright landing leg, a bogie structure including at least one wheel-supporting member that extends longitudinally of the direction of flight and at least one wheel assembly journaled thereon upon an axis directed transversely of such direction of flight, at least one additional wheel assembly journaled upon said bogie structure upon an axis spaced longitudinally from and parallel to the axis of the first-mentioned wheel assembly, pivot means parallel to the axes of the two wheel assemblies and offset longitudinally from the one first-mentioned, and supporting the bogie structure from the lower end of the leg for swinging in a fore-and-aft longitudinal plane; brake means for said wheel assemblies, said brake means including a brake plate pivotally mounted coaxially of the journal axis of the first-mentioned wheel assembly, for swinging movement with the bogie structure relative to the leg, but for pivotal movement independently of the wheel-supporting member of the bogie structure, a torque link pivotally connected at its one end to said brake plate at a point radially offset from the journal axis of the corresponding wheel assembly, a pivot connection for the opposite end of said torque link, at a point fixed with respect to said leg and offset from the supporting pivot axis of the bogie structure by a distance similar to the radial offset of the pivot of the torque link's opposite end upon the brake plate, a fluid pressure brake actuating device operatively connected to the same wheel assembly, and fluid-pressure conduits extending from said landing leg to the corresponding brake actuating device, said conduits including two swivel joints supported fixedly and coaxially with relation to the respective pivotal connections at the opposite ends of the torque link, a section fixedly mounted upon said torque link and joining said two swivel joints, a section fixedly mounted upon said brake plate and connected respectively to the corresponding swivel joint and to the corresponding brake actuating device, and a section fixedly mounted with respect to the leg, and connected to the other swivel joint.

4. The combination of claim 3 including a similar brake means for the second-mentioned wheel assembly, and a conduit connection from the leg-mounted section through the intervening swivel joint which is coaxial with the torque link's pivot connection that is fixed with relation to the leg, and extending to the brake actuating device for such second-mentioned wheel assembly.

References Cited in the file of this patent
UNITED STATES PATENTS

| | | |
|---|---|---|
| 1,802,692 | Zindel | Apr. 28, 1931 |
| 1,852,230 | Breguet | Apr. 5, 1932 |
| 2,533,607 | Neilson et al. | Dec. 12, 1950 |
| 2,568,092 | Sloan et al. | Sept. 18, 1951 |
| 2,578,200 | Nicholl | Dec. 11, 1951 |
| 2,579,180 | Eldred | Dec. 18, 1951 |
| 2,659,615 | McClain | Nov. 17, 1953 |